(12) United States Patent
Ruffner et al.

(10) Patent No.: US 8,931,471 B2
(45) Date of Patent: Jan. 13, 2015

(54) HYBRID CONCRETE SAW

(71) Applicant: Diamond Products, Limited, Elyria, OH (US)

(72) Inventors: Thomas G. Ruffner, Oberlin, OH (US); Martin Marsic, Highland Heights, OH (US)

(73) Assignee: Diamond Products, Limited, Elyria, OH (US)

( * ) Notice: Subject to any disclaimer, the term of this patent is extended or adjusted under 35 U.S.C. 154(b) by 136 days.

(21) Appl. No.: 13/799,208

(22) Filed: Mar. 13, 2013

(65) Prior Publication Data

US 2013/0247897 A1   Sep. 26, 2013

Related U.S. Application Data

(60) Provisional application No. 61/613,568, filed on Mar. 21, 2012.

(51) Int. Cl.
*B28D 1/04* (2006.01)
*B23D 47/12* (2006.01)

(52) U.S. Cl.
CPC ............... *B28D 1/045* (2013.01); *B23D 47/12* (2013.01)
USPC ........................................... 125/14; 451/353

(58) Field of Classification Search
USPC ............... 125/14, 13.01, 12; 451/353, 350, 5; 180/65.265, 65.27, 65.275; 299/39.1, 299/39.3
See application file for complete search history.

(56) References Cited

U.S. PATENT DOCUMENTS

| | | | |
|---|---|---|---|
| 5,172,784 A | 12/1992 | Varela, Jr. | |
| 5,678,646 A | 10/1997 | Fliege | |
| 5,724,956 A | 3/1998 | Ketterhagen | |
| 6,318,353 B1 | 11/2001 | Edwards et al. | |
| 6,719,538 B2 | 4/2004 | Ota et al. | |
| 7,114,585 B2 | 10/2006 | Man et al. | |
| 7,117,864 B2 | 10/2006 | Marques et al. | |
| 7,942,142 B2 * | 5/2011 | Gobright, IV | 125/13.01 |
| 8,347,872 B2 * | 1/2013 | Gobright, IV | 125/13.03 |
| 8,677,985 B2 * | 3/2014 | Gobright, IV | 125/13.03 |
| 2004/0005190 A1 * | 1/2004 | Jakits | 404/75 |
| 2010/0043767 A1 | 2/2010 | Marsic et al. | |
| 2013/0267377 A1 * | 10/2013 | Jenkins, Jr. | 477/3 |

* cited by examiner

*Primary Examiner* — Robert Rose
(74) *Attorney, Agent, or Firm* — Rankin, Hill & Clark LLP (57) ABSTRACT

A hybrid concrete saw includes a saw blade, an internal combustion engine having an output shaft operably connected to the saw blade, and an electric motor connectable to a battery for receiving power therefrom and having an output shaft operably connected to the saw blade. A transmission is connected to the output shaft of each of the engine and the electric motor and the saw blade. A clutch selectively decouples one of the engine and the electric motor from the transmission. A controller controls operation of the engine and the electric motor. The concrete saw is operable in a first mode where the saw blade is driven solely by the engine, a second mode where the saw blade is driven solely by the electric motor, and a third mode where the saw blade is driven by both the engine and the electric motor.

20 Claims, 6 Drawing Sheets

FIG. 7

HYBRID CONCRETE SAW

The present application claims priority to U.S. Provisional Patent Applicant Ser. No. 61/613,568 filed on Mar. 21, 2012, the disclosure of which is incorporated herein in its entirety.

BACKGROUND

Exemplary embodiments herein generally relate to a self-propelled operator-guided or steerable hybrid concrete saw In the concrete industry, when building bridges, buildings, roads and the like, it is often necessary to pour large horizontal slabs of concrete. Once poured, it is usually necessary to machine the slab. Such machining may include cutting seams completely through the slab (to form expansion joints and to allow for foundation shifting), cutting notches partially into the slab (to create stress cracks along which the slab will split), cutting multiple grooves into the slab to create a high friction surface such as for bridges, grinding the surface of the slab and the like. While performing a cut, the operator controls the direction, cutting speed, cutting depth and the like. Concrete saws are also used in the demolition or removal of concrete, such as during the sawing and replacement of bridge decks. Various types of concrete saws may be utilized to carry out these machining and demolition tasks. In larger industrial applications, large self-propelled saws are used that are powered in a variety of manners, such as by gasoline, diesel, electric, propane and natural gas engines mounted on the saw. Concrete saws that are powered by an internal combustion engine or that are electrically powered and include an internal combustion engine generator cannot be used indoors due to the exhaust generated. The present invention provides a hybrid concrete saw that is configured for both outdoor and indoor cutting.

BRIEF DESCRIPTION

In accordance with one aspect, a hybrid concrete saw comprises a generally rectangular frame having a front end, a read end and a longitudinal length. The frame has a pair of rear wheels and a pair of front wheels for facilitating movement of the saw. A saw blade is rotatably mounted to the frame and configured to be driven. An internal combustion engine is mounted to the frame and has a rotational output shaft operably connected to the saw blade for driving the saw blade. An electric motor is mounted to the frame and is operably connectable to a battery for receiving power therefrom. The electric motor has a rotational output shaft operably connected to the saw blade for driving the saw blade. A transmission is operably connected to the output shaft of each of the engine and the electric motor and the saw blade. The transmission has a clutch adapted to selectively decouple one of the engine and the electric motor from the transmission. A controller is configured to control operation of the engine and the electric motor. The concrete saw is operable in a first mode where the saw blade is driven solely by the engine. The concrete saw is operable in a second mode where the saw blade is driven solely by the electric motor.

In accordance with another aspect, a hybrid concrete saw comprises a frame having a pair of rear wheels and a pair of front wheels for facilitating movement of the saw. A saw blade is rotatably mounted to the frame and configured to be driven. An internal combustion engine is mounted to the frame and has a rotational output shaft operably connected to the saw blade for driving the saw blade. An electric motor/generator is mounted to the frame. The electric motor has a rotational output shaft operably connected to the saw blade for driving the saw blade. A transmission is operably connected to the output shaft of each of the engine and the electric motor and the saw blade. The transmission has a clutch adapted to selective decouple one of the engine and the electric motor from the transmission. The concrete saw is operable in a first mode where the saw blade is driven solely by the engine. The concrete saw is operable in a second mode where the saw blade is driven solely by the electric motor. The concrete saw is operable in a third mode where the saw blade is driven by both the engine and the electric motor.

In accordance with yet another aspect, a hybrid concrete saw comprises a frame having a pair of rear wheels and a pair of front wheels for facilitating movement of the saw. A saw blade is rotatably mounted to the frame and configured to be driven. A drive system is mounted to the frame and configured to drive the rear wheels at a desired speed in a forward and rearward direction. A lift system is mounted to the frame and configured to tilt the frame for displacing the saw blade in a generally vertical direction relative to the frame. An internal combustion engine is mounted to the frame and has a rotational output shaft operably connected to the saw blade for driving the saw blade. An electric motor is mounted to the frame and operably connectable to a battery for receiving power therefrom. The electric motor has a rotational output shaft operably connected to the saw blade for driving the saw blade. A generator is operably connected to each of the engine, the electric motor and the battery. The generator is configured to convert mechanical power of the engine to electrical current for selectively powering the electric motor and selectively recharging the battery. A transmission is operably connected to the output shaft of each of the engine and the electric motor and the saw blade. The transmission has a clutch adapted to selective decouple one of the engine and the electric motor from the transmission. The concrete saw is operable in a first mode where the saw blade is driven solely by the engine. The concrete saw is operable in a second mode where the saw blade is driven solely by the electric motor. The concrete saw is operable in a third mode where the saw blade is driven by both the engine and the electric motor.

DETAILED DESCRIPTION

It should, of course, be understood that the description and drawings herein are merely illustrative and that various modifications and changes can be made in the structures disclosed without departing from the present disclosure. In general, the figures of the exemplary hybrid concrete saw are not to scale. For purposes of understanding, the term "signal" utilized herein is defined as any electrical signal or any stored or transmitted value. For example, a signal can comprise a voltage, or a current. Further, a signal can comprise any stored or transmitted value such as binary values, scalar values, or the like. It will also be appreciated that the various identified components of the exemplary hybrid concrete saw disclosed herein are merely terms of art that may vary from one manufacturer to another and should not be deemed to limit the present disclosure.

Referring now to the drawings, wherein like numerals refer to like parts throughout the several views, FIGS. 1-4 illustrate an hybrid concrete saw 100 for cutting seams, notches and/or grooves into or through asphalt, concrete, stone or other similar surfaces concrete, asphalt, stone and other hardened surfaces according to the present disclosure. The concrete saw 100 includes an implement or blade 102, an internal combustion engine 104 and an electric driving system having an electric motor/generator 106 for selectively driving the saw blade 102 depending on an operational mode of the saw, a frame 108 for supporting the engine 104 and motor/generator 106, a selectively positionable front wheel assembly having a set of front wheels 110 and a rear wheel assembly having a set of rear wheels 112. The saw 100 is preferably a self-propelled saw, and thus the rear wheels 112 are driven in a manner described below. However, it will be appreciated that saw 100 could be a push-type saw.

Figure 1:
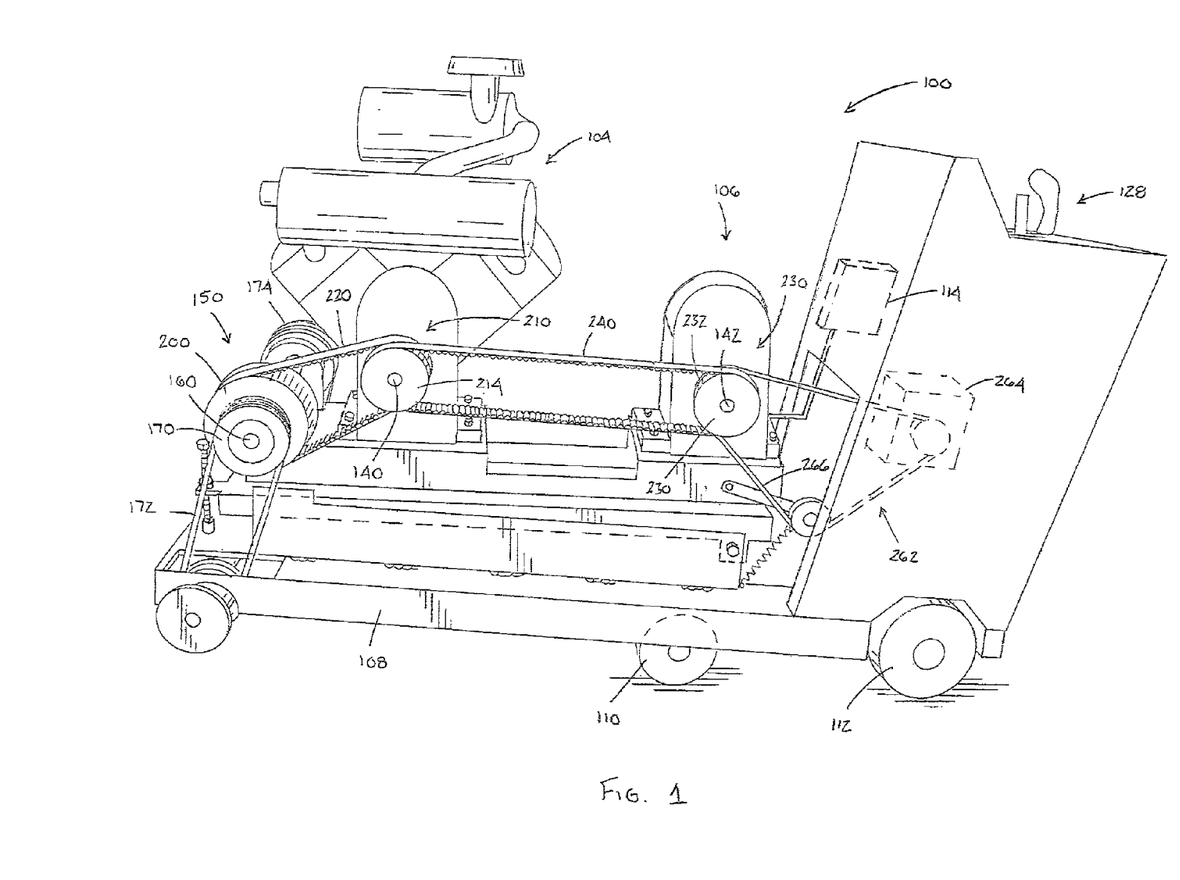
FIG. 1 is a left side perspective view of a hybrid concrete saw according to one aspect of the present invention.

The motor/generator 106 consists of an electric motor for selectively driving the saw blade 102 mechanically coupled to an electric generator (or alternator). A speed regulator 116 can be coupled to the motor/generator 106 so as to control the velocity of an output shaft of the electric motor. The speed regulator can also provide motor driving and control functions including starting and stopping control, torque regulation, phase control, voltage and current control. The electric motor runs on the electrical input current while the generator creates the electrical output current. The motor/generator 106 is operably connected to the engine 104 and, as is well known, converts the mechanical power of the engine to electricity with the electric generator and converts it back to mechanical power with the electric motor. A rechargeable battery 114 is mounted to the frame 108 in a suitable manner and is electrically connected to the motor/generator 106. The battery 114 can be a conventional lead acid battery, a nickel-cadmium battery, a nickel metal hydride battery, a lithium battery, or a combination of conventional batteries. In use, the electric motor receives electric power from either the battery 114 or from the generator run by the engine 104. A controller 118 of the concrete saw is in signal communication with the electronic driving system for controlling powering of the electric motor. This electric motor control has a variable speed with overload protection so cutting can be performed at a desired speed without damage to the electric motor. The controller 118 is configured to determine how much of the power comes from the battery 114 or the motor/generator 106. The controller is also configured to monitor the status of the battery and when power demands are low, the controller can actuate the motor/generator 106 to recharge the battery 114. For example, when the engine 104 is running, the controller 118 controls the generator to generate current which is stored in the battery 114 and subsequently fed to the electric motor.

It should also be appreciated that that concrete saw 100 can include a charging system 124 having an external charger that supplies current to the battery 114 to recharge the battery 114. According to one aspect, the charging system 124 can be a plug-in charging system with a plug connection for connecting by a cord to an AC wall plug in an external outlet. The plug-in charging system is further connected through a line to the battery 114, which, again, is electrically connected to the electric motor 106. According to another aspect, the charging system 124 can include a solar panel mounted to the frame 108 and electrically connected through a line to the battery 114.

Figure 5:
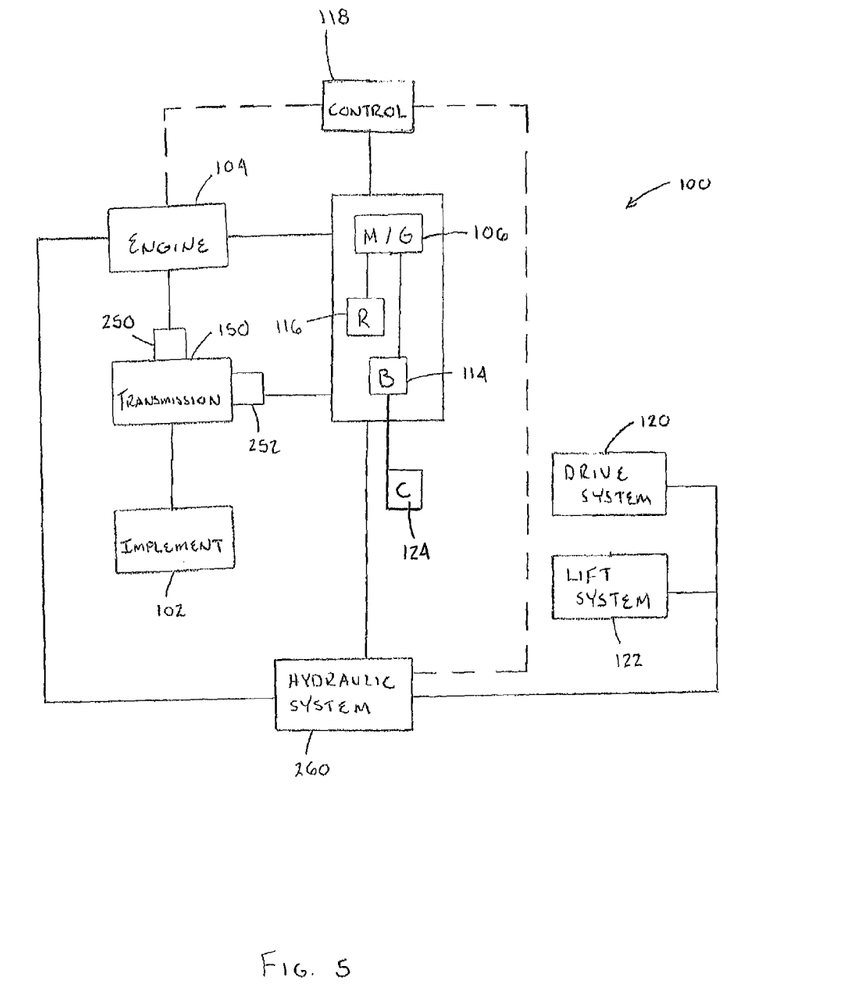
FIG. 5 is a schematic view of an operating system for operating the concrete saw of FIG. 1 according to one aspect of the present disclosure.

The hybrid operating system schematically depicted in FIG. 5 for the concrete saw 100 can be a parallel operating system and/or a series operating system. With a parallel operating system, both the engine 104 and the electric motor of the motor/generator 106 generate the power that drives the saw blade 102. The controller 118 together with a transmission 150 (which is described below) allow the engine and electric motor to work together. With a series operating system, only one of the engine 104 and electric motor 106 drives the saw blade 102. By combining the two operating systems for the hybrid concrete saw 100, the engine 104 and electric motor 106 can both drive the saw blade 102 and each of the engine 104 and electric motor can be effectively disconnected from the saw blade 102 so that only one of the engine and electric motor powers the saw blade.

As schematically illustrated in FIG. 5, the operating system of the concrete saw 100 also includes operational systems such as a locomotion or drive system 120 and a lift system 122. The drive system 120 drives the rear wheels 112 supporting the saw frame 108 at a desired speed in a forward and rearward direction. The lift system 122 tilts the saw frame 108. When tilted, the saw blade 102 may be taken out of contact with the substrate being cut (see FIG. 4). The concrete saw 100 can include an engine mounting system that minimizes vibration within the frame. The saw also includes at least one speed selection lever 128 for controlling the speed of advancement of the saw. Additionally, the concrete saw 100 can include some type of dampening mechanism that interrupts direct communication between the engine 104 and/or the electric motor 106 (depending on which is driving the saw blade) and saw blade 102 when the blade encounters significant predetermined resistance.

Figure 2:
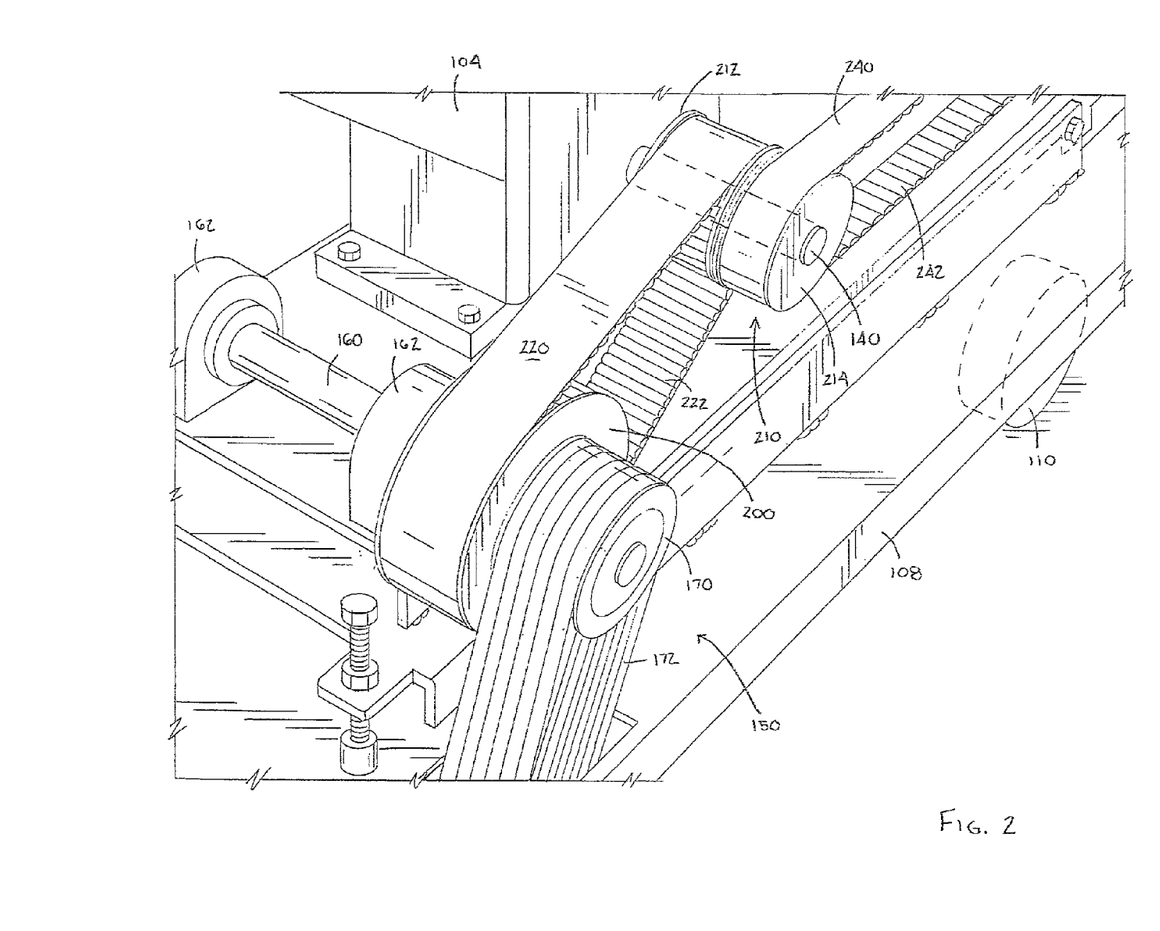
FIG. 2 is an enlarged perspective view of a transmission including a sprocket assembly associated with a saw blade of the concrete saw of FIG. 1.
Figure 3:
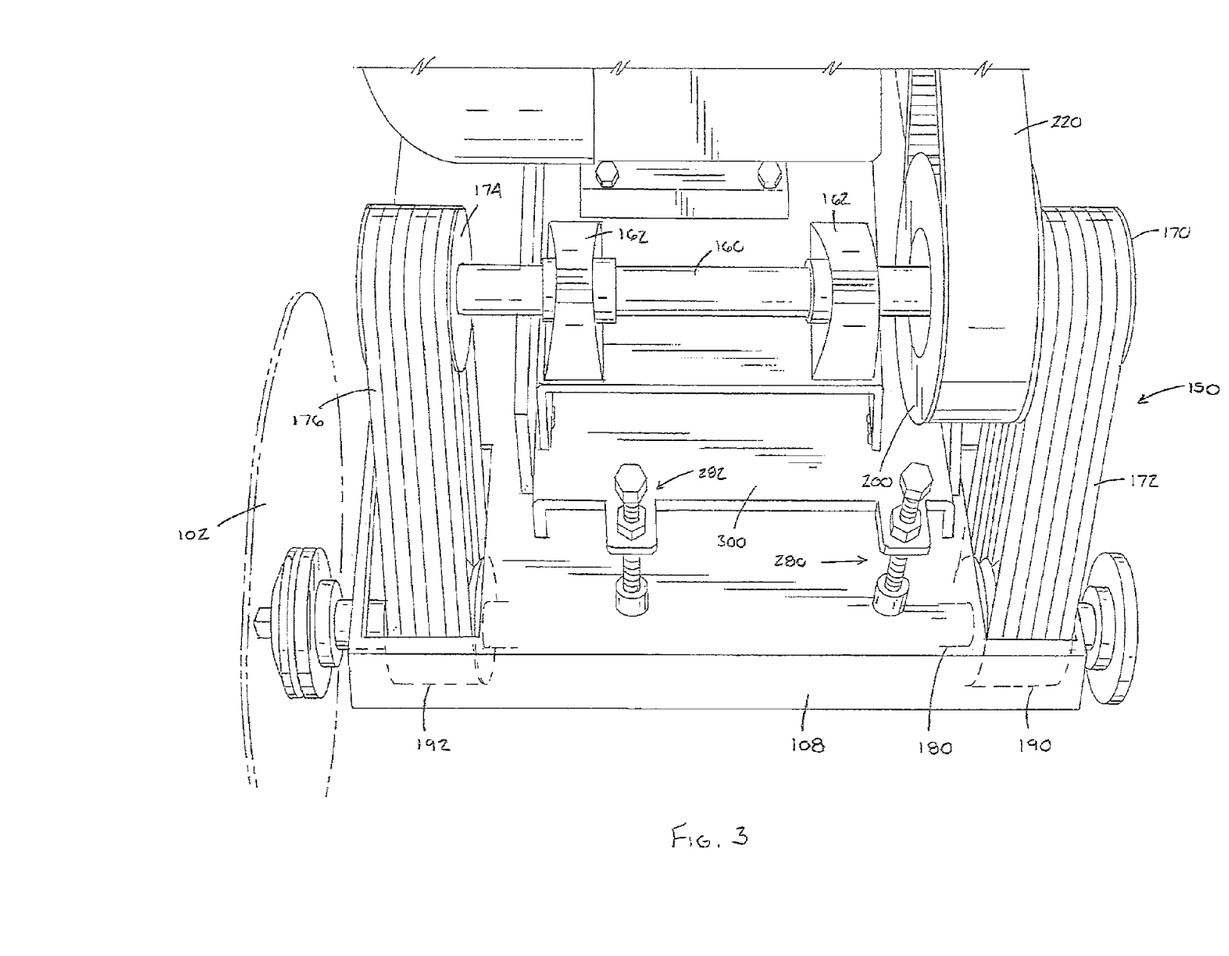
FIG. 3 is an enlarged front prospective view of the concrete saw of FIG. 2.
Figure 4:
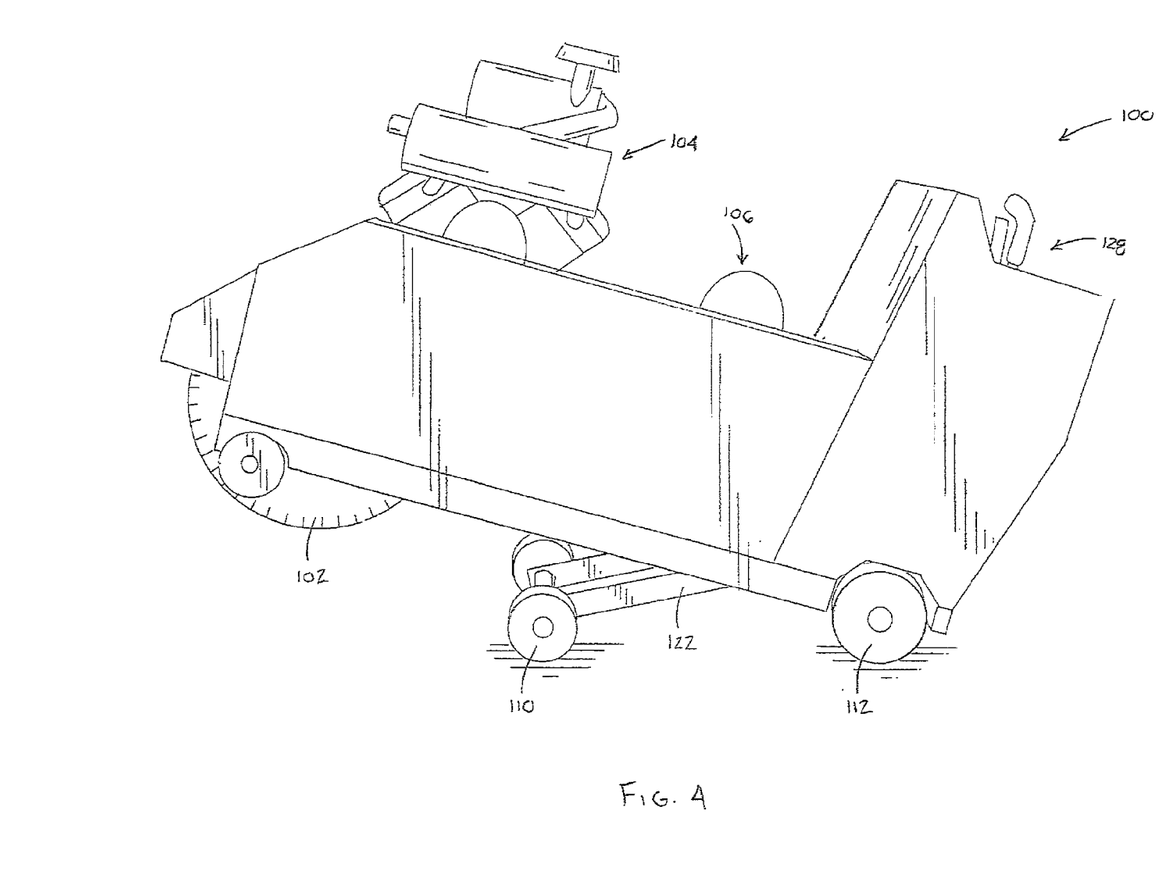
FIG. 4 is a side perspective view of the concrete saw of FIG. 1 in a tilted position.

With particular reference to FIGS. 1-3, the engine 104 and electric motor of the motor/generator 106 are positioned in parallel, side by-side relationship on the frame 108 and are of a type generally known in the art. With this parallel relationship, each of the engine 104 and electric motor 106 is oriented with its respective driven output shaft or crankshaft 140, 142 generally perpendicular to an axis defined by the length of the frame 108. This transverse arrangement aligns the output shafts 140, 142 parallel to the rotational axis of the saw blade 102, to afford an easy design for interconnecting pulleys of the transmission 150 upon the output shafts and the saw blade. The transverse arrangement also allows the concrete saw 100 to be easily moved through doorways and other narrow passages.

The concrete saw 100 includes the transmission 150 for transmitting rotational energy from each of the engine 104 and electric motor 106 to the saw blade 102. In the exemplary embodiment, the transmission 150 includes a first drive or jack shaft 160, which is oriented substantially parallel with the output shafts 140, 142, is supported at each end by bearings 162, 162 for transmitting power across the front of the concrete saw 100 and to the saw blade 102. The first jack shaft 160 includes at one end a first multi-sheave pulley 170 for driving one or more V-belts 172 and at the other end a second multi-sheave pulley 174 for driving one or more V-belts 176. A second drive or jack shaft 180 (i.e., saw blade shaft), which is oriented parallel to the first jack shaft 160, is connected to the saw blade 102, and is supported by bearing (not shown)

mounted to the frame 108. The second jack shaft 180 includes at one end a third multi-sheave pulley 190 and at the other end a fourth multi-sheave pulley 192. As shown, the one or more V-belts 172 are engaged with the first and third sheave pulleys 170 and 190 and the one or more V-belts 176 are engaged with the second and fourth sheave pulleys 174 and 192. Located at the fore end of the first jack shaft 160 and inside of the first sheave pulley 170 is a sprocket 200. In the depicted embodiment, the sprocket 200 and the first sheave pulley 170 are of different diameters; although, this is not required. As shown, sprocket 200 can have a diameter which is about twice the diameter of first sheave pulley 170.

The transmission 150 further includes a sprocket assembly 210 provided on and selectively connected to the output shaft 140 of the engine 104 and comprises a pair of sprockets 212 and 214. Extending between sprocket 200 and sprocket 212 is a flexible belt 220. The belt 220 includes a plurality of teeth extending along the inside surface or diameter 222 of the belt 220. The teeth of belt 220 engage teeth formed along the outer diameter of the sprockets 200 and 212. Similarly, provided on and selectively connected to the output shaft 142 of the electric motor 106 is a sprocket assembly 230 including a pair of sprockets 232 and 234. Extending between sprocket 214 and sprocket 234 is a flexible belt 240 which includes a plurality of teeth extending along the inside surface or diameter 242 the belt 240. The teeth of belt 240 engage the teeth formed along the outer diameter of the sprockets 214 and 234. As shown, the sprockets 212, 214, 234 have approximately equal diameters; though it should be appreciated that the sprockets can be of different diameters. Also, the sprocket 200 has a diameter larger than the diameters of the sprockets 212, 214, 234; although, this is not required. It should be appreciated that with the exemplary transmission 150, the concrete saw 100 is capable of operating at different rotational cutting speeds. It should also be appreciated that the depicted transmission 150 is one example of a transmission for the concrete saw 100 and that alternative arrangements/configurations for the transmission of the concrete saw 100 are contemplated. For example, in lieu of the belts, the transmission can be chain driven or the transmission can include a gear mechanism which interconnects each of the output shafts 140, 142 of the engine 104 and electric motor 106 and the jack shaft 180 that is connected to the saw blade 102.

As indicated above, the saw blade 102 can be selectively driven by the engine 104 and/or the electric motor of the motor/generator 106. To that end, the transmission 150 includes at least one clutch configured to selectively decouple one of the output shafts 140, 142 and/or sprocket assemblies 210, 230 of the respective engine 104 and electric motor 106 from the transmission depending on the operational mode of the concrete saw 100 (i.e., depending on whether the engine 104 and/or the electric motor 106 is driving the saw blade 102). As schematically illustrated in FIG. 5, the transmission 150 includes a pair of clutches 250, 252, one clutch operably associated with each of the engine 104 and the electric motor 106. For example, in an engine only mode, the clutch 252 decouples the output shaft 142 and/or sprocket assembly 230 of the electric motor from the transmission 150. In an electric motor only mode, the clutch 252 decouples the output shaft 140 and/or sprocket assembly 210 of the engine 104 from the transmission 150.

With reference back to FIG. 5, the concrete saw includes a hydraulic system 260. The hydraulic system 260 is operatively connected to the drive system 120 and the lift system 122 and is in signal communication with the control 118. Hydraulic power for the drive system 120 and lift system 122 is provided by the hydraulic system 260, which is selectively powered by one of the engine 104 and electric motor 106. The hydraulic system 260 can include multiple hydraulic pumps (not shown), one pump for a hydraulic motor(s) (not shown) that drives the rear wheels 112 in one of a forward and reverse direction and one pump for a hydraulic cylinder (not shown) of the lift system 120. The controller 118 is provided on the concrete saw 100 for controlling the speed of the engine 104 and the electric motor 106 and the speed and direction of the hydraulic flow of the hydraulic system 260 used to power the hydraulic motor(s) and hydraulic cylinder described above. For example, as shown in FIG. 1, operably connected to the sprocket 232 is a hydrostatic transmission 262 that powers a hydrostatic motor 264 that is used to propel the concrete saw 100. The hydrostatic transmission 262 is operably connected to the sprocket assembly 230 via a power belt 266.

With reference now to FIG. 3, a pair of V-belt tensioner assemblies 280, 282 can be provided at a forward end of the frame 108. The tensioner assemblies 280, 282 provide for positional adjustment, and preferably vertical adjustment, between the output shaft 140 of engine 104 (which can be mounted on a motor mount 300 positioned on the frame 108), the first jack shaft 160 and the second jack shaft 180. This enables positional adjustment, i.e. the spacing between the sprocket 200 located on the jack shaft and the sprocket 212 located on the output shaft 140, and between the first and second sheave pulleys 170, 174 and the third and fourth sheave pulleys 190, 192. Adjustment of the spacing between sheave pulleys 170, 174 provides for tension adjustment of the one or more V-belts 172, 176 extending between the sheave pulleys. Adjustment of the tensioner assemblies also provides for vertical adjustment between the frame 108 and the motor mount 300.

With reference again to FIG. 5, the controller 118 can be one of mechanically and electrically connected to the engine 104 and the electric driving system including the motor/generator 106. For a self-propelled concrete saw, the controller 118 can also be connected to the hydraulic system 260 associated with the driven set of rear wheels 112 for controlling operation of the hydraulic system. As indicated above, the hybrid operating system of the concrete saw 100 can operate in a parallel mode wherein both the engine 104 and electric motor 106 drive the saw blade 102. By coupling the engine and electric motor together such that their respective output shafts 140, 142 turn at substantially the same rate, the engine and electric motor can contribute proportionally to the driving of the saw blade 102. The controller 118 can be configured to ensure that the output shafts 140, 142 turn at substantially the same rate. For example, a load sensor can be provided for each of the engine 104 and electric motor 106. The load sensors are in signal communication with the controller 118 which can be configured to calculate the load of the engine and electric motor. The loads can be compared and operation of the engine 104 and electric motor 106 can be controlled to again ensure that the output shafts 140, 142 are turning substantially at the same rate.

Figure 6:
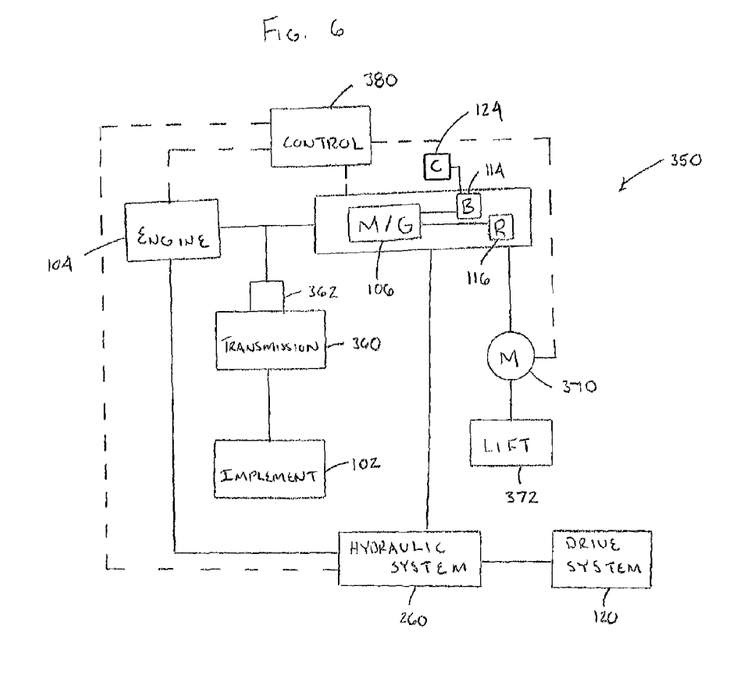
FIG. 6 is a schematic view of an operating system for operating the concrete saw of FIG. 1 according to another aspect of the present disclosure.

FIG. 6 schematically illustrates another operating system 350 for the hybrid concrete saw 100 according to the present disclosure. As indicated above, the saw 100 includes the implement or saw blade 102, the internal combustion engine 104, and the electric driving system having the motor/generator 106. Operably connected to the motor/generator 106 are the battery 114 and the speed regulator 116. A transmission 360 having at least one clutch 362 is provided for selectively connecting the engine 104 and/or electric motor to the saw blade 102. Again, depending on the operational mode of the concrete saw 100, the operating system 350 is configured to allow the engine 104 and/or the electric motor 106 to drive the saw blade 102. The concrete saw 100 includes the hydraulic system 260 which is operatively connected to the drive system 120. Hydraulic power for the drive system is provided by the hydraulic system 260, which is powered by one of the engine 104 and electric motor 106. The concrete saw 100 further includes a separate electric motor 370 operably connected to and powered by the electric driving system. The electric motor 370 is adapted to drive a lift system 372. Similar to lift system 122, the lift system 372 can include a hydraulic cylinder having one end that is secured in a suitable manner to the frame 108 and having another end that has a pivotal connection to the front wheel assembly. A hydraulic pump has a fluid connection to the cylinder and is rotatively driven by the second electric motor 370 which has a power connection to the battery 114. A controller 380 is one of mechanically or electrically connected to and is configured to control the operation of the engine 104, the electric driving system, the hydraulic system 260 and the secondary electric motor 370.

Figure 7:
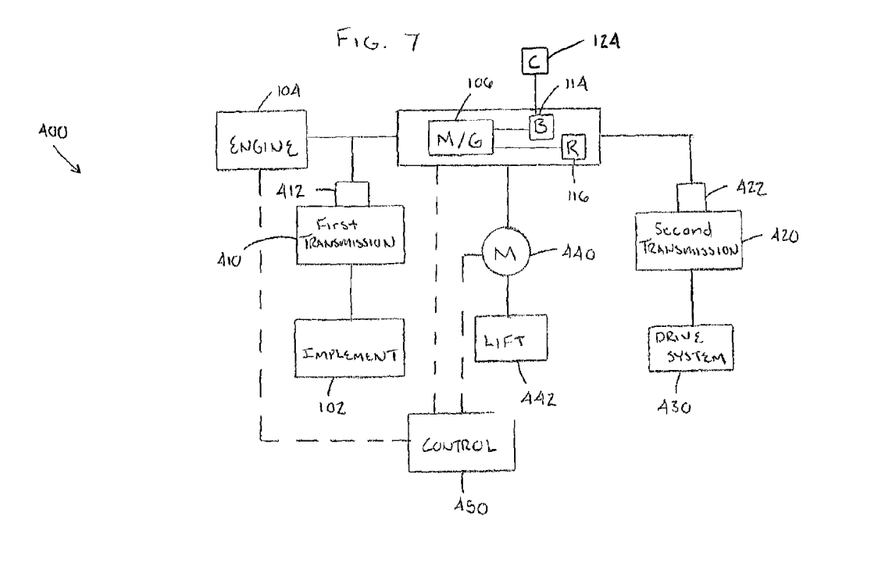
FIG. 7 is a schematic view of an operating system for operating the concrete saw of FIG. 1 according to yet another aspect of the present disclosure.

FIG. 7 schematically illustrates another operating system 400 for the hybrid concrete saw 100 according to the present disclosure. Again, the saw 100 includes the implement or saw blade 102, the internal combustion engine 104, and the electric driving system having the motor/generator 106, the battery 114 and the speed regulator 116. A first transmission 410 having at least one clutch 412 is provided for selectively connecting the engine 104 and/or electric motor to the saw blade 102. Similar to the above described operating systems, depending on the operational mode of the concrete saw 100, the operating system 400 is configured to allow the engine 104 and/or the electric motor 106 to drive the saw blade 102. The electric driving system is operably connected to a second transmission 420 having at least one dutch 422. The second transmission 420 selectively connects the electric motor 106 to a drive system 430, which, similar to drive system 120, is configured to drive the rear wheels 112 in one of a forward and reverse direction. The concrete saw 100 further includes a separate electric motor 440 operably connected to and powered by the electric driving system. The electric motor 460 is adapted to drive a lift system 442 that is similar to lift system 372 described above. A controller 450 is one of mechanically or electrically connected to and is configured to control the operation of the engine 104, the electric driving system, and the secondary electric motor 440.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A hybrid concrete saw comprising:
    a generally rectangular frame having a front end, a read end and a longitudinal length, the frame having a pair of rear wheels and a pair of front wheels for facilitating movement of the saw;
    a saw blade rotatably mounted to the frame and configured to be driven;
    an internal combustion engine mounted to the frame and having a rotational output shaft operably connected to the saw blade for driving the saw blade;
    an electric motor mounted to the frame and operably connectable to a battery for receiving power therefrom, the electric motor having a rotational output shaft operably connected to the saw blade for driving the saw blade;
    a transmission operably connected to the output shaft of each of the engine and the electric motor and the saw blade, the transmission having a dutch adapted to selective decouple one of the engine and the electric motor from the transmission; and
    a controller configured to control operation of the engine and the electric motor,
    wherein the concrete saw is operable in a first mode where the saw blade is driven solely by the engine and the concrete saw is operable in a second mode where the saw blade is driven solely by the electric motor.

2. The hybrid concrete saw of claim 1, wherein the concrete saw is operable in a third mode where the saw blade is driven by both the engine and the electric motor, wherein in the third mode the output shafts of the engine and the electric motor are coupled together by the transmission such that the output shafts of the engine and electric motor drive of the saw blade.

3. The hybrid concrete saw of claim 1, further including a charging system having an external charger configured to supply current to the battery to recharge the battery.

4. The hybrid concrete saw of claim 1, further including a drive system mounted to the frame and configured to drive the rear wheels at a desired speed in a forward and rearward direction, and a lift system mounted to the frame and configured to tilt the frame for displacing the saw blade in a generally vertical direction relative to the frame.

5. The hybrid concrete saw of claim 4, further including a hydraulic system mounted to the frame and operably connected to and configured to provide power to one of the drive system and lift system, the hydraulic system being selectively powered by one of the engine and electric motor, the controller adapted to control operation of the hydraulic system.

6. The hybrid concrete saw of claim 4, further including a second electric motor mounted to the frame and operably connected to and configured to provide power to the lift system, the controller adapted to control operation of the second electric motor, the second electric motor receiving power from the battery.

7. The hybrid concrete saw of claim 6, wherein the electric motor is operably connected to and configured to provide power to the drive system, and further including a second transmission interconnecting the output shaft of the electric motor and the drive system.

8. The hybrid concrete saw of claim 1, further including a generator mounted to the frame and operably connected to each of the engine, the electric motor and the battery, wherein the generator is configured to convert mechanical power of the engine to electrical current for selectively powering the electric motor and selectively recharging the battery.

9. The hybrid saw of claim 8, wherein the controller is configured to monitor a charge status of the battery, wherein if the charge status of the battery is low the controller is configured to actuate the engine and generator to recharge the battery.

10. The hybrid concrete saw of claim 8, wherein the controller is operably connectable to the battery and the generator for controlling the powering of the electric motor.

11. The hybrid concrete saw of claim 1, wherein the frame supports the engine and electric motor in a front-to-back relationship, the rotational output shaft of each of the engine and electric motor being aligned generally transverse to the longitudinal length of the frame.

12. The hybrid concrete saw of claim 1, wherein the output shafts of the engine and electric motor are coupled together by sprocket assemblies of the transmission, and the transmission further includes a rotatable jack shaft oriented parallel to the outputs shafts of the engine and electric motor, the jack shaft having a sprocket and at least one sheave pulley, the sprocket being operably connected to one of the sprocket assemblies of the engine and electric motor, the at least one sheave pulley being operably connected to at least one sheave pulley of a saw blade shaft.

13. The hybrid concrete saw of claim 12, further comprising a plurality of flexible belts for interconnecting the sprocket assemblies of the engine and electric motor, the at least one sheave pulley of the saw blade shaft, and the sprocket and at least one sheave pulley of the jack shaft.

14. A hybrid concrete saw comprising:
a frame having a pair of rear wheels and a pair of front wheels for facilitating movement of the saw;
a saw blade rotatably mounted to the frame and configured to be driven;
an internal combustion engine mounted to the frame and having a rotational output shaft operably connected to the saw blade for driving the saw blade;
an electric motor/generator mounted to the frame, the electric motor having a rotational output shaft operably connected to the saw blade for driving the saw blade; and
a transmission operably connected to the output shaft of each of the engine and the electric motor and the saw blade, the transmission having a dutch adapted to selective decouple one of the engine and the electric motor from the transmission;
wherein the concrete saw is operable in a first mode where the saw blade is driven solely by the engine, the concrete saw is operable in a second mode where the saw blade is driven solely by the electric motor, and the concrete saw is operable in a third mode where the saw blade is driven by both the engine and the electric motor.

15. The hybrid concrete saw of claim 14, further including a drive system mounted to the frame and configured to drive the rear wheels at a desired speed in a forward and rearward direction, and a lift system mounted to the frame and configured to tilt the frame for displacing the saw blade in a generally vertical direction relative to the frame.

16. The hybrid concrete saw of claim 15, further including a hydraulic system mounted to the frame and operably connected to and configured to provide power to one of the drive system and lift system, the hydraulic system being selectively powered by one of the engine and electric motor, the controller adapted to control operation of the hydraulic system.

17. The hybrid concrete saw of claim 15, wherein the electric motor is operably connectable to a rechargeable battery for receiving power therefrom, and further including a second electric motor mounted to the frame and operably connected to and configured to provide power to the lift system, the second electric motor receiving power from the battery.

18. The hybrid concrete saw of claim 17, wherein the electric motor is operably connected to and configured to provide power to the drive system, and further including a second transmission interconnecting the output shaft of the electric motor and the drive system.

19. A hybrid concrete saw comprising:
a frame having a pair of rear wheels and a pair of front wheels for facilitating movement of the saw;
a saw blade rotatably mounted to the frame and configured to be driven;
a drive system mounted to the frame and configured to drive the rear wheels at a desired speed in a forward and rearward direction;
a lift system mounted to the frame and configured to tilt the frame for displacing the saw blade in a generally vertical direction relative to the frame;
an internal combustion engine mounted to the frame and having a rotational output shaft operably connected to the saw blade for driving the saw blade;
an electric motor mounted to the frame and operably connectable to a rechargeable battery for receiving power therefrom, the electric motor having a rotational output shaft operably connected to the saw blade for driving the saw blade;
a generator mounted to the frame and operably connected to each of the engine, the electric motor and the battery, wherein the generator is configured to convert mechanical power of the engine to electrical current for selectively powering the electric motor and selectively recharging the battery;
a transmission operably connected to the output shaft of each of the engine and the electric motor and the saw blade, the transmission having a dutch adapted to selective decouple one of the engine and the electric motor from the transmission;
wherein the concrete saw is operable in a first mode where the saw blade is driven solely by the engine, the concrete saw is operable in a second mode where the saw blade is driven solely by the electric motor, and the concrete saw is operable in a third mode where the saw blade is driven by both the engine and the electric motor.

20. The hybrid saw of claim 19, further including:
a controller configured to monitor a charge status of the battery, wherein if the charge status of the battery is low the controller is configured to actuate the engine and generator to recharge the battery; and
a charging system having an external charger configured to supply current to the battery to recharge the battery.

* * * * *